I. SEITZMAN.
ICE CREAM CUTTER.
APPLICATION FILED JULY 8, 1920.
1,360,033.
Patented Nov. 23, 1920.
2 SHEETS—SHEET 1.
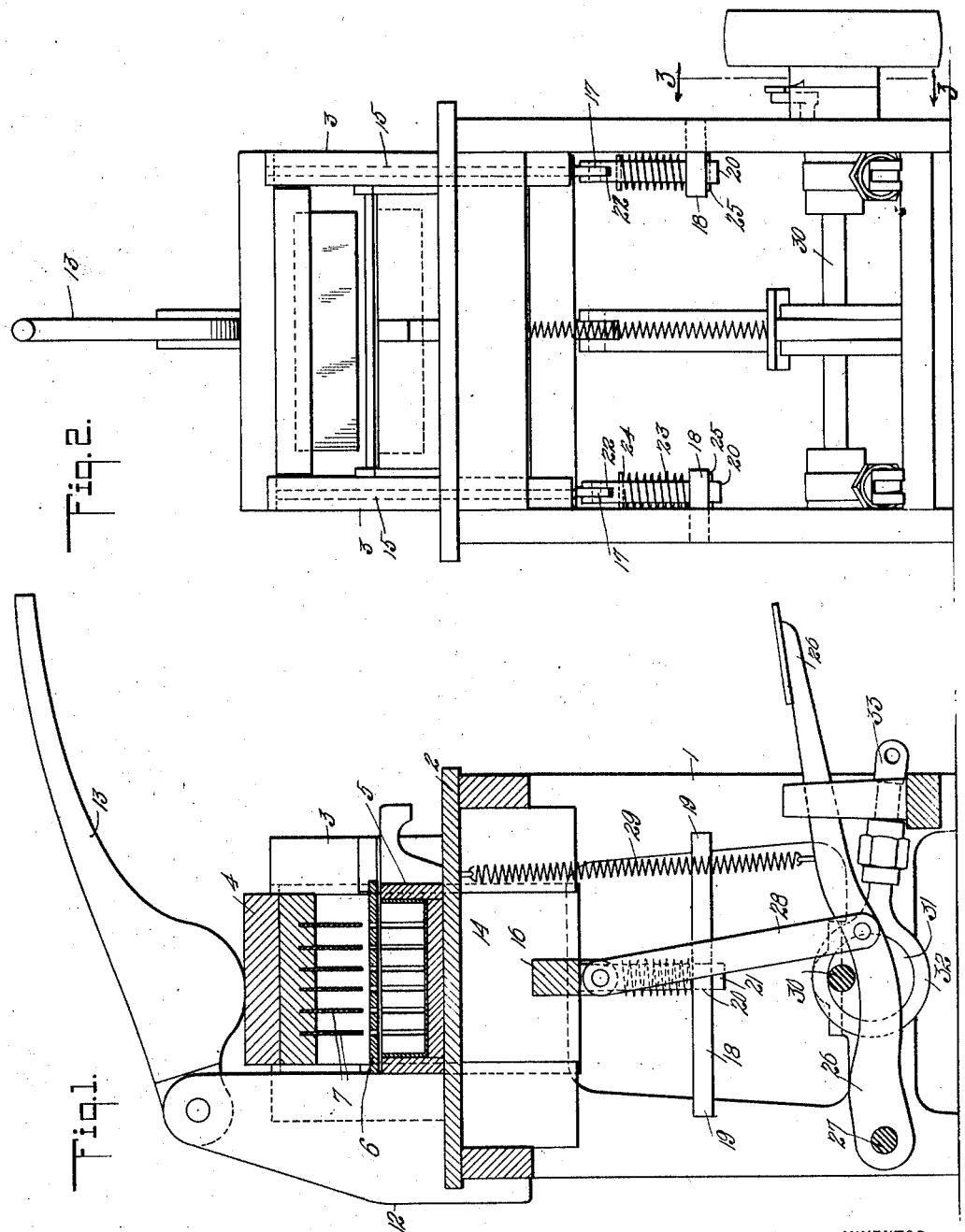
WITNESSES
Frederick Diehl.
S. W. Foster
INVENTOR
Isaak Seitzman
BY
ATTORNEYS

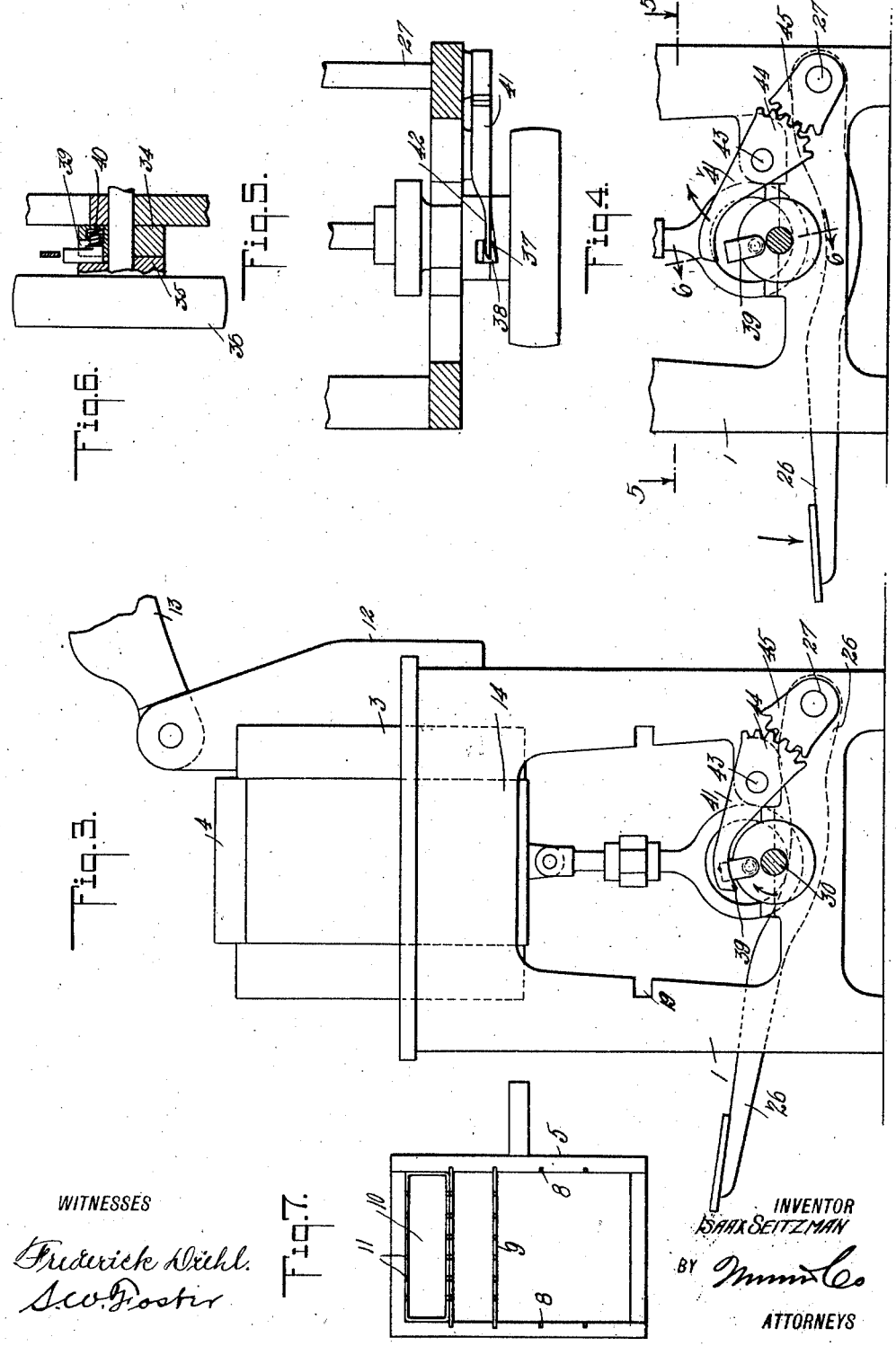

UNITED STATES PATENT OFFICE.

ISSAX SEITZMAN, OF BROOKLYN, NEW YORK.

ICE-CREAM CUTTER.

1,360,033.  Specification of Letters Patent.  Patented Nov. 23, 1920.

Application filed July 8, 1920. Serial No. 394,854.

*To all whom it may concern:*

Be it known that I, ISSAX SEITZMAN, a citizen of the United States, and a resident of the city of New York, borough of Brooklyn, in the county of Kings and State of New York, have invented a new and Improved Ice-Cream Cutter, of which the following is a full, clear, and exact description.

This invention relates to improvements in ice cream cutters, an object of the invention being to provide improved means for simultaneously cutting a large number of bricks into pieces of uniform or any desired sizes.

A further object is to provide a machine of the character stated which may be operated either by hand power, foot power or engine power.

A further object is to provide an improved construction of tray in which the bricks are supported and cut.

A further object is to provide an ice cream cutter of the character stated which will not only cut the bricks into pieces of uniform size, but will perform the operation quickly, economically and in a sanitary manner.

With these and other objects in view the invention consists in certain novel features of construction, and combinations and arrangements of parts as will be more fully hereinafter described and pointed out in the claims.

In the accompanying drawings—

Figure 1 is a view in vertical transverse section illustrating my improved ice cream cutter showing the parts in position for operation either by hand or foot power.

Fig. 2 is a view in front elevation with the parts as shown in Fig. 1.

Fig. 3 is an end view showing my improved device with the parts arranged for power drive, the view being taken in section on the line 3—3 of Fig. 2.

Fig. 4 is a view similar to the lower portion of Fig. 3, illustrating the clutch controlling mechanism in another position.

Fig. 5 is a view in section on the line 5—5 of Fig. 4.

Fig. 6 is a view in section on the line 6—6 of Fig. 4.

Fig. 7 is a plan view illustrating an ice cream supporting tray.

1 represents a supporting frame having a table 2 thereon. Along the table 2 a guide frame 3 is secured and provides mounting for a vertically movable plunger 4. A drawer or tray 5 is adapted to be moved into the guide frame 3 and supported on the table 2 and above this drawer or tray 5 a slotted stripper plate 6 is mounted and cutting blades 7 are secured to the plunger 4 and are movable through the stripper plate 6 and into the drawer or tray 5 to sever blocks of ice cream, which may be supported in the tray, into pieces of the desired number and size in accordance with the number and arrangement of blades.

The drawer or tray 5 is preferably formed with registering notches 8 for the accommodation of notched partitions 9 to separate the bricks of ice cream and if desired, individual receptacles 10 having notched walls 11 may be located in the tray so that the bricks will be maintained apart and each brick, after being cut into pieces, can be separately removed.

It is obvious that I may construct the trays in various ways and have any desired number, size and shape thereof so that trays containing uncut bricks can be in readiness for insertion in the machine and the trays containing the cut bricks can be removed and emptied and returned after being supplied with new bricks.

With the machine illustrated I employ several different means for operating the plunger 4. I provide a standard 12 on the table 2 and pivotally connect to the standard a hand lever 13 engaging the plunger 4 so that this lever may be manually operated to force the plunger downwardly. The plunger 4 is carried by vertically movable side bars 14 having tongue and groove guides, as shown at 15, in the frame 3 and extending through the table 2. These side bars 14 are connected by a cross bar 16, the latter having perforated lugs 17 at its ends.

Removable bars 18 are positioned in notches 19 in the sides of frame 1 and are perforated, as shown at 20, for the accommodation of vertically positioned rods 21. The upper ends of these rods 21 are bifurcated and pivotally connected to the lugs 17 as shown at 22, and coiled springs 23 are located around the rods 21 and between the bars 18 and pins 24 on the rods to exert upward pressure on the rods and return the plunger 4 to elevated position. Pins 25 are positioned through the lower portions of the rods 21 to limit the upward movement of the rods and the plungers.

A foot lever or treadle 26 is secured on a cross rod 27 having rotary mounting in the frame 1 and extends forwardly in position to be easily reached by the operator's foot and this lever is connected by a link 28 with the bar 16 so that the plunger may be depressed by the foot lever if desired. A coiled spring 29 connects the foot lever 26 with the table 2 and normally holds the lever in elevated position.

By reason of the construction above described, it will be noted that the plunger 4 can be depressed either by the hand lever 13 or the foot lever 26.

When it is desired to convert the machine into a power driven machine a shaft 30 is supported in the frame 1 and is provided with eccentrics 31 having eccentric straps 32 thereon connected by links 33 with the lugs 17 above referred to so that it will be understood that when the machine is to be driven by power, the rods 21 and blocks or bars 18 will be dispensed with and the links 33 connected directly with the lugs 17 as indicated in Fig. 3.

On the shaft 30 a clutch member 34 is secured and is located beside a clutch member 35 which latter is loose on the shaft and is fixed to turn with a drive pulley 36. The clutch members 34 and 35 are in the form of relatively thick hubs or disks and the clutch member 35 is made with a ratchet recess 37 in its inner face in which a spring pressed pin 38 carried by member 34 normally engages. This pin 38 is of general angular form and is accommodated in a recess 39 in member 34 and a coiled spring 40 presses the pin toward the member 35 with the outer portion of the pin projecting beyond the periphery of the clutch members and in position to be engaged by a lever 41 pivotally supported on a pin 43 secured in frame 1. This lever 41 has a cam face 42 which is adapted to be engaged by the pin 38 so as to force the pin laterally out of the recess 37 and disconnect the clutch.

The lever 41 is provided with a gear segment 44 in mesh with a gear segment 45 on the rod 27 so that the movement of the rod 27 by the foot lever 26 serves to transmit a pivotal motion to the lever 41 to elevate the cam end of said lever out of the path of the pin 38.

By reason of the construction above described, the operation of the foot lever 26 causes the lever 41 to be elevated out of the path of the pin 38 allowing said pin to move laterally into clutching engagement with the member 35, so that the power transmitted to the pulley 36 will be transmitted to the shaft 30 to turn the latter. This movement of the shaft 30, through the medium of the eccentrics 31 and the links 33, will impart a downward movement to the plunger 4 to sever the ice cream bricks.

When the foot lever 26 is released, the cam lever 41 will move downwardly to its normal position in the path of the pin 38 so that as the shaft 30 completes its revolution, the pin 38 will engage the cam face 42 and be forced laterally thereby so as to disconnect the clutch.

It will thus be noted that with my improved machine, by a simple rearrangement of parts, the plunger may be power operated and foot controlled to cause a single operation at each operation of the foot lever or the power mechanism may be disconnected and the plunger operated either by the hand lever above or the foot lever below.

While I have described my improved machine in connection with the operation of cutting ice cream blocks into pieces, it is obvious that it might be employed for cutting other goods or material, and hence I do not wish to be limited to the use for ice cream only, although this is its primary use.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. An ice cream cutter, comprising a table, a guide frame on the table, a tray movable in the guide frame, a plunger having vertical movement in the guide frame, a series of cutting blades on the plunger, a stripper mounted in the guide frame above the tray and having slots therein through which the blades of the cutter pass when the cutter is moved vertically, and notched partitions in the tray through which the blades move to sever the contents of the tray into separate pieces.

2. An ice cream cutter, comprising a frame, a cutting plunger movable in the frame, a shaft operatively connected to the plunger, a pair of clutch members on the shaft, a spring pressed pin adapted to lock said clutch members together, a cam lever normally holding the pin out of operative engagement, a rod mounted in the frame, a foot lever on the rod, and a pair of gear segments connecting the foot lever and the cam lever.

3. In an ice cream cutting machine, the combination with a plunger, of an ice cream supporting tray having notches therein, notched partitions in the notches of the tray, notched receptacles adapted to be located between the partitions and support the bricks of cream to be cut.

ISSAX SEITZMAN.